United States Patent

Brutscher et al.

[11] Patent Number: 5,803,677
[45] Date of Patent: Sep. 8, 1998

[54] HOLE SAW

[75] Inventors: David T. Brutscher, Louisville; Donald M. Szymanski, Prospect, both of Ky.

[73] Assignee: Credo Tool Company, Woodburn, Oreg.

[21] Appl. No.: 738,758

[22] Filed: Aug. 9, 1996

[51] Int. Cl.⁶ .................................................. B23B 51/04
[52] U.S. Cl. ........................ 408/204; 408/206; 408/703
[58] Field of Search .................................. 408/204, 206, 408/703, 205, 207–209

[56] References Cited

U.S. PATENT DOCUMENTS

| 2,062,257 | 11/1936 | Douglas et al. | 408/204 |
|---|---|---|---|
| 3,387,637 | 6/1968 | Ferguson et al. | 408/204 |
| 3,430,526 | 3/1969 | Valenziano | 408/204 |
| 3,559,513 | 2/1971 | Hougen | 408/204 |
| 5,597,274 | 1/1997 | Behner | 408/204 |

FOREIGN PATENT DOCUMENTS

| 2302808 | 10/1976 | France | 408/703 |
|---|---|---|---|
| 39708 | 2/1988 | Japan | 408/204 |
| 404105811 | 4/1992 | Japan | 408/204 |
| 408154709 | 6/1993 | Japan | 408/204 |

OTHER PUBLICATIONS

Vermont American Corp., Power Tool Accessories and Hand Tools, Product Catalog, C–795, pp. 70–75 (Jul. 1995).

The Credo Company, Power Tool Accessories catalog, p. D2, (1989).

*Primary Examiner*—Steven C. Bishop
*Attorney, Agent, or Firm*—McDermott, Will & Emery

[57] ABSTRACT

A hole saw comprises a cup with two cutting teeth positioned on the open end of the cup. The two cutting teeth are substantially diametrically opposed to one another to provide a balanced cutting engagement of the media and are spaced apart by a chord length of between about 45 to about 180 degrees. A pair of secondary gullets are positioned in the cup proximate to a forward cutting edge of the two cutting teeth. The secondary gullets have a predetermined depth and shape along a longitudinal axis of the cup to suitably remove debris from the cup during a portion of the duration of the hole cut. A plurality of raker teeth may be positioned on the chords defining the spacing between the cutting teeth. The raker teeth are disposed below the cutting teeth, approximately 0.030 inches to engage and move cutting debris formed by the cutting teeth.

14 Claims, 5 Drawing Sheets

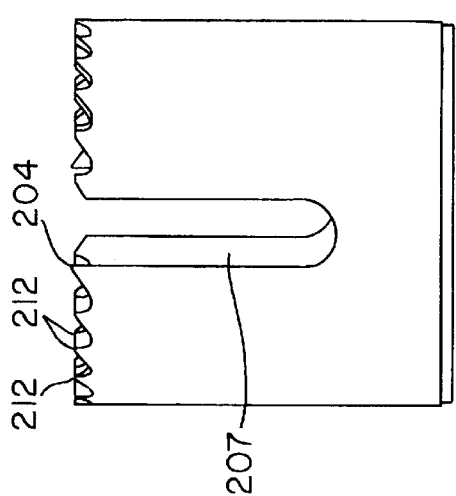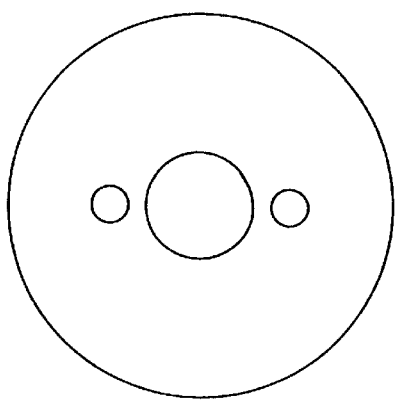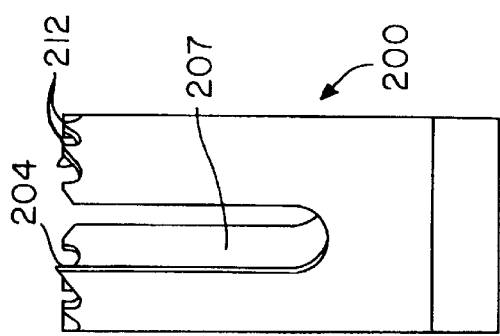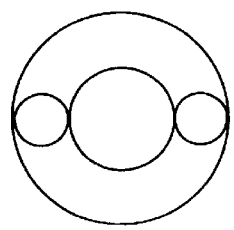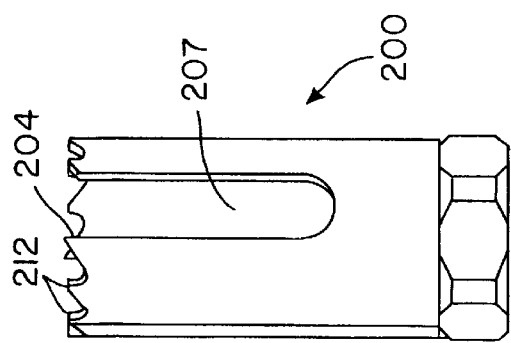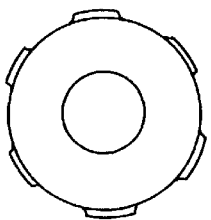

HOLE SAW

BACKGROUND OF THE INVENTION

The present invention relates to a hole saw, and more particularly to a fast-cut hole saw having cutting teeth substantially spaced apart a predetermined chord length from one another and secondary gullets positioned flush with an edge of the cutting teeth so as to provide fast cutting of a predetermined hole size in a media.

In the prior art, conventional hole saws share design features that prohibit such saws from being capable of removing chips from the cutting site in an efficient manner. The major design features that cause this inefficiency appear to include the number of teeth, the side clearance, and the absence of a chip conveyance device. It is believed that the interior of the saw when filled with debris slows the cutting process due to energy wasted to compact or churn the wood chips.

For example, most prior art hole saws have either a four or six teeth per inch (tpi) configuration which causes small gullets, or the open area adjacent to the cutting edge of the teeth, to have quite a small cross-sectional area. These small "primary" gullets can be easily clogged by chips during the cutting process which prevents each tooth from cutting effectively. Secondly, cutting clearance between the teeth and the saw body is generally in the range of 0.012"–0.015". All hole saws normally use an alternating set pattern on the teeth, which provides the necessary clearance for the outside diameter ("OD") and inside diameter ("ID") of the saw body. While this clearance is fine when the tooth exits the cutting media, as in the case of circular saws, it can create a problem for a hole saw since a hole saw does not exit the media.

It is for this reason that cutting chips can become clogged in the area between the hole saw and the side walls of the hole. Finally, prior art hole saws do not provide an efficient method of removing or conveying the chips from the hole, such as do twist drills, which again causes the chips to remain at the cutting site.

In greater detail, a conventional hole saw, such as those used to drill large circular holes ranging from ¾" to 6" in diameter in a door or other member, is illustrated in FIG. 1. The hole saw 10 comprises a cup shaped structure (or "cup") 12 having angled cutting teeth 14 positioned about the circumference of the open portion of the cup 12. The cutting teeth 14 are typically triangular shaped and formed with the cutting edge 16 alternately directed towards the interior and exterior of the circumference of the cup 12. The cup diameter "D" having the cutting teeth 14 about the circumference is equal to the diameter or size of the hole to be cut. A plurality of triangular openings (or "primary gullets") 22 are formed between the cutting teeth 14 to provide openings for the exit or removal of cutting debris.

In such a hole saw, a center drill 18 (or "drill") is typically secured or affixed to the bottom center or base end of the cup by an arbor 20, mandrel, or the like. For example, U.S. Pat. No. 5,435,672 issued to Richard L. Hall et al. Jul. 25, 1995 entitled "Hole Saw Having Plug Ejection Feature", hereby incorporated by reference, illustrates at FIG. 3 et seq. an arbor arrangement of securing or positioning a center drill in a base end of a cup. This center drill 16 provides precise centering of the hole saw to accurately position the hole saw to cut a hole of predetermined size, with a plurality of proximate, closely-spaced circumferential positioned cutting teeth providing the cutting of the outside perimeter of the hole. In another example, U.S. Pat. No. 5,096,341 issued on May 3, 1988 to Despres entitled "Hole Saw and Drive" illustrates the use of a mandrel to secure a center drill and for expelling a hole plug.

In the prior art, a pair spaced apart "closed" angular set gullets (not shown) have been used to provide an opening to remove a hole plug, such as those shown in the Vermont American Catalog entitled "POWER TOOL ACCESSORIES AND HAND TOOLS, Product Catalog C-795, dated 1995. While the hole plug can be removed, the cutting debris can continue to clog the hole saw with the above attendant disadvantages impairing performance.

Also, in practice a typical wood hole saw cup is formed from a carbon steel. An improvement to such hole saws has been the use of a "Bimetal" structure where the hole saw cup is formed from carbon steel, and a second "tough" steel with excellent wear characteristics, such a High Speed Steel ("HSS") forms the cutting teeth. Normally, the HSS steel is affixed to cup opening by integrally welding it to the carbon steel cup, thereby forming a "Bimetal" cup. In this manner, the HHS cutting teeth provides a cutting surface with excellent wear and toughness characteristics.

In addition to a "Bimetal" hole saw, the prior art also includes a single tooth carbide insert having a single "open" gullet, which removes cutting debris to at least the depth of the structure. Such a device is manufactured by Credo, shown in the Credo® Power Tool Accessories at page D-2 (1989) As a carbide bit can be tooled to provide separate inward and outer directed circumferential cutting surfaces, this single tooth carbide hole saw can provide a reasonable cutting tool but at an increased cost of manufacture over a Bimetal tool, e.g., the carbide tooth must be tooled and affixed by welding or the like to the hole saw cup.

None of the prior art devices described above provide the important advantages of a improved hole saw presenting a faster, and more aggressive cutting of a hole in a media. Also, none of the above devices uses spaced apart cutting teeth to direct debris and chips through a pair of secondary gullets thereby providing a smooth and accurate hole in the media.

SUMMARY OF THE INVENTION

According to the invention, a hole saw comprises a cup with at least two cutting teeth positioned on the open end of the cup. The two cutting teeth are positioned substantially diametrically opposed to one another in order to provide a balanced cutting engagement of the media. One of the cutting teeth has the cutting edge directed outward of the circumference of the cup and the other of the cutting teeth is directed inwardly of the circumference of the cup. The two teeth are spaced apart by a chord length of between about 45 to about 180 degrees.

Preferably, the hole saw defines at least a pair of secondary gullets positioned in the cup proximate to a forward cutting edge of the two cutting teeth. The gullets have a predetermined depth and shape along a longitudinal axis of the cup to remove debris from the cup during a portion of the duration of the hole cut.

In a preferred embodiment, a plurality of raker teeth may be positioned on the chords defining the spacing between the cutting teeth. The raker teeth are disposed below the cutting teeth approximately 0.030 inches to engage and move the cutting debris caused by the cutting teeth.

As pointed out in greater detail below, the fast-cut hole saw of this invention provides the following important advantages of improving chip flow from the cutting edge and therefore increasing cutting efficiency. In more detail, a significant number of the cutting teeth were removed, with the preferred design comprising two teeth being approximately 180 degrees opposed to one another. In this manner, the chip load per tooth is increased and the cutting teeth concentrates chip flow. Further, by adding large expansive gullets to the leading edge of the cutting teeth provides the chips an egress to flow out of the cutting area without clogging or binding the operation of the hole saw.

The invention itself, together with further objects and attendant advantages, will best be understood by reference to the following detailed description taken in conjunction with the accompanying drawings.

BRIEF DESCRIPTION OF THE DRAWINGS

FIG. 6 is an alternate embodiment illustrating the invention with a fast-cut hole saw cup of about 1⅛ inches in diameter;

FIG. 7 is an alternate embodiment illustrating the invention with a fast-cut hole saw cup of about 1¼ inches in diameter; and FIG. 8 is an alternate embodiment illustrating the invention with a fast-cut hole saw cup having a range of about 1½ inches to about 2½ inches in diameter.

DETAILED DESCRIPTION OF THE INVENTION

Figure 1:
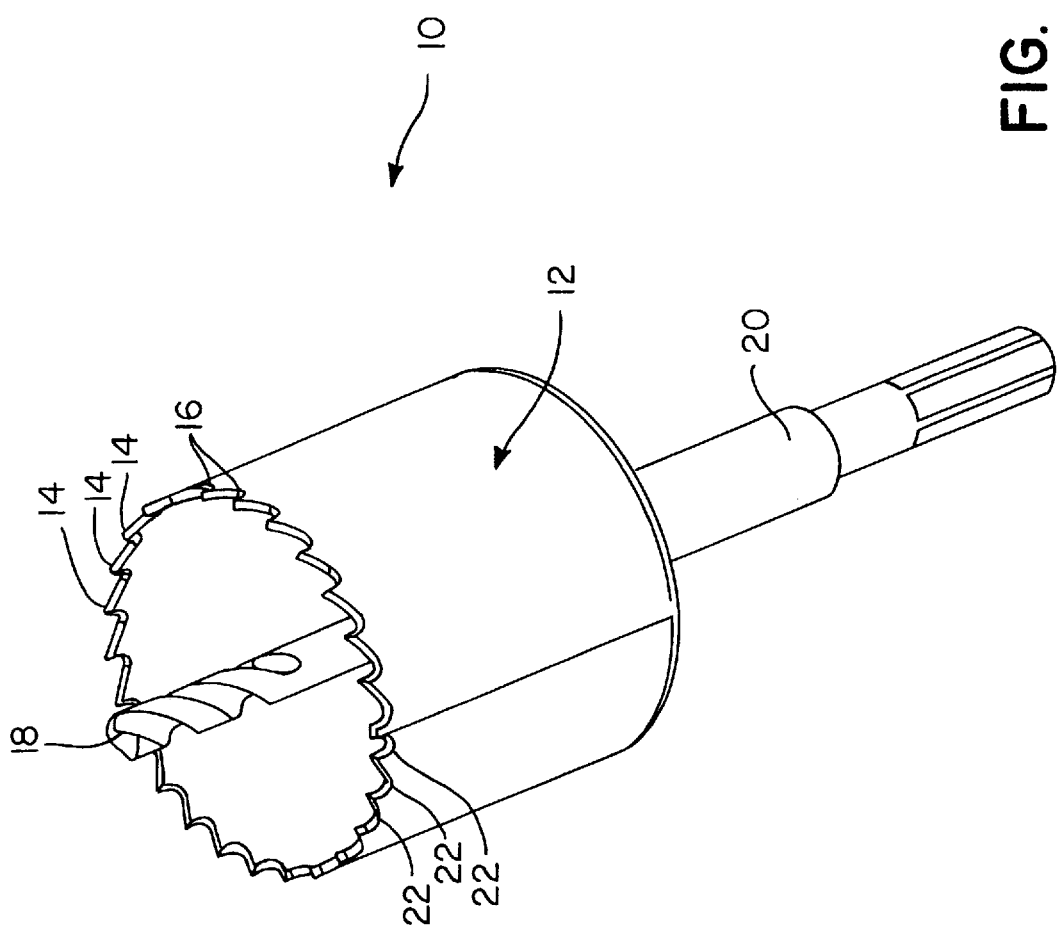
FIG. 1 shows a conventional "Bimetal" hole saw.
Figure 2:
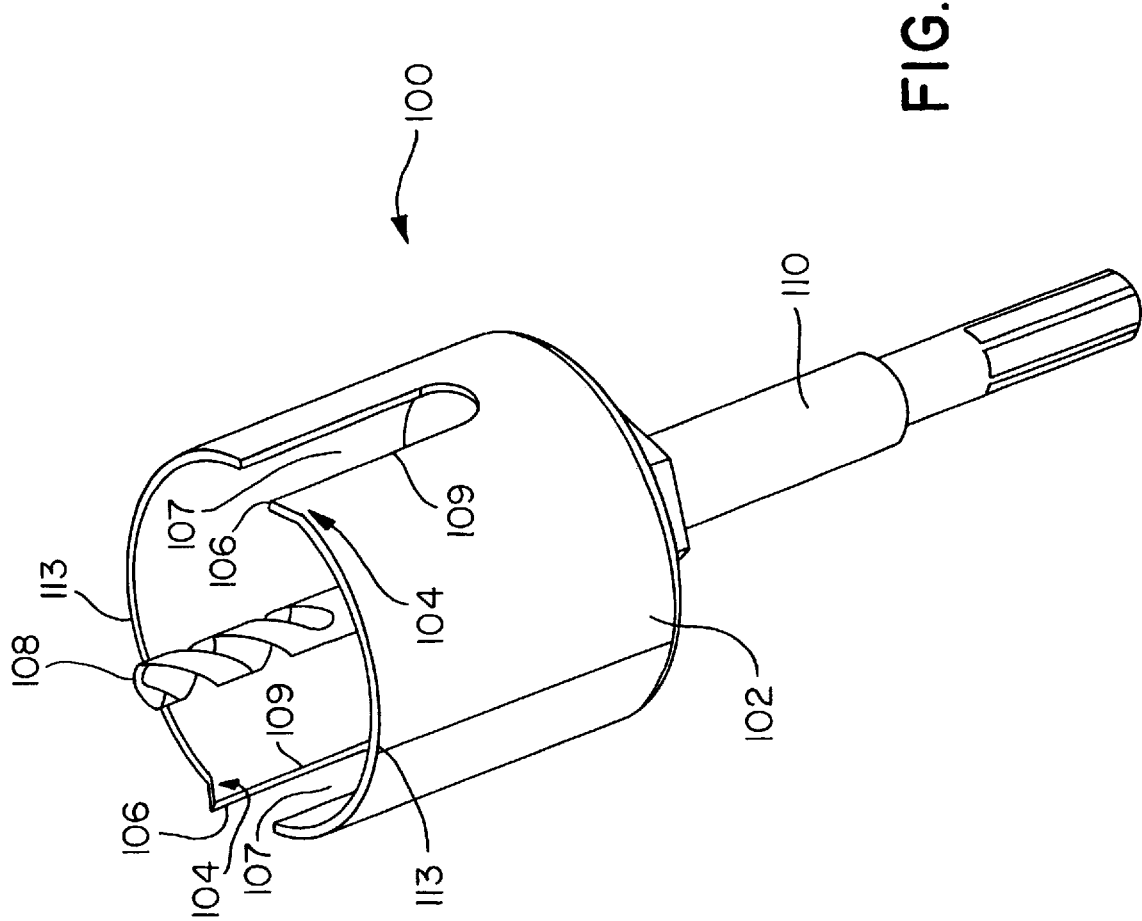
FIG. 2 shows a fast-cut hole saw of the present invention.

Turning now to the drawings, in the preferred embodiment illustrated in FIG. 2, the optimal cutting saw or "fast-cut hole saw" 100 for bore holes includes a hole saw cup 102 which has two cutting teeth 104 spaced substantially diametrically opposed from each other. In this manner, the rotational thrust of the cutting teeth 104 is balanced upon engagement and cutting of the media.

As illustrated in FIG. 2, a pair of opposed secondary gullets (or "gullets") 107 are positioned along a cutting edge 106 proximate to the cutting teeth 104. Each gullet 107 defines a generally open ended slot-shaped opening positioned forward of the cutting edge 106 of the cutting teeth 104. The gullets 107 are normally positioned diametrically opposed to one another in order to provide balanced removal of chips and debris. One exposed edge 109 of each gullet 107 is positioned substantially flush with the cutting tooth edge 106. Each gullet 107 defines an opening of at least the depth "d-d" of a media or surface structure to be cut so as to allow the debris to be removed from the interior of the cutting device. The gullets 107 also define a minimum chord width or breadth ("c-c") which is about equal to a chord length of the cutting teeth 104. It is important to recognize that the secondary gullets 107 are in addition to the primary gullets 113 formed between the cutting teeth 104.

As illustrated in FIG. 2, a center drill 108 (or "drill") may be secured to the base end of the fast-cut hole saw cup 102 by an arbor 110, or mandrel, or the like, e.g., U.S. Pat. No. 5,435,672 issued to Richard L. Hall et al. Jul. 25, 1995 entitled "Hole Saw Having Plug Ejection Feature" describes a suitable arrangement for securing a center drill 108 in the base end of the cup by use of an arbor. This center drill 108 provides precise centering of the hole saw 100 and accurately positions the hole saw 100 to cut a hole of a predetermined size.

In the preferred embodiment, the number of cutting teeth 104 using the bi-metal set tooth structure should be at least two teeth with the preferred number of cutting teeth being an even number of cutting teeth. This structure enables cutting to occur on at least one inside diameter (ID) tooth and one outside diameter (OD) tooth of the hole saw 100; and evens out the cutting thrust. Due to structural and/or manufacturing issues, the preferred design is of the two cutting teeth 104 and the two gullets 107, which offers substantially improved cutting speed, as illustrated in the following EXAMPLE.

EXAMPLE

The primary performance difference between the fast-cut hole saw design and other existing hole saws is in the speed of cut through a media. Samples of the fast-cut hole saws and other conventional Bimetallic hole saws were tested to understand the average time needed to cut through a media of a 2"×6" yellow pine media. The average time needed to cut through the yellow pine board media with the fast-cut hole saw was about 9 seconds. In contrast, the average time needed for the conventional hole saws having a plurality of teeth, including 4 or 6 teeth per inch (tpi) configuration, was about 25 seconds. As determined from the tests, a significant reduction of about 36 per cent in the average time required by conventional hole saws was achieved by using the present invention.

Figure 3:
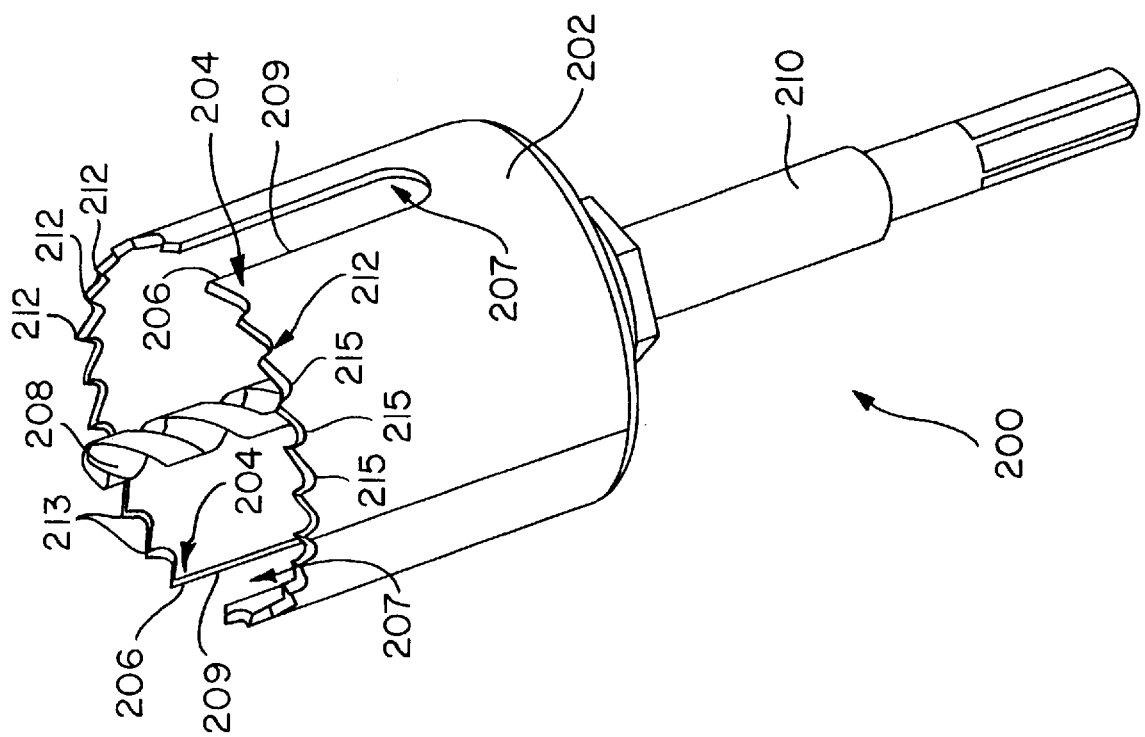
FIG. 3 shows another embodiment of the fast-cut hole saw of the present invention having raker teeth positioned below the cutting teeth.

Variations on the embodiments described above are possible. For example, as illustrated in FIG. 3, the fast-cut hole saw 200 design can feature a plurality of raker teeth 212 that serve as feed limiting devices which control the cutting aggressiveness of the hole saw 200. In this embodiment, the fast-cut hole saw cup 202 includes cutting teeth 204, and a pair of gullets 207 having a gullet edge 209 positioned flush to the cutting edge 206 of the cutting teeth 204. A center drill 208 is positioned at the base end of the cup 202 by an arbor 210.

Figure 4:
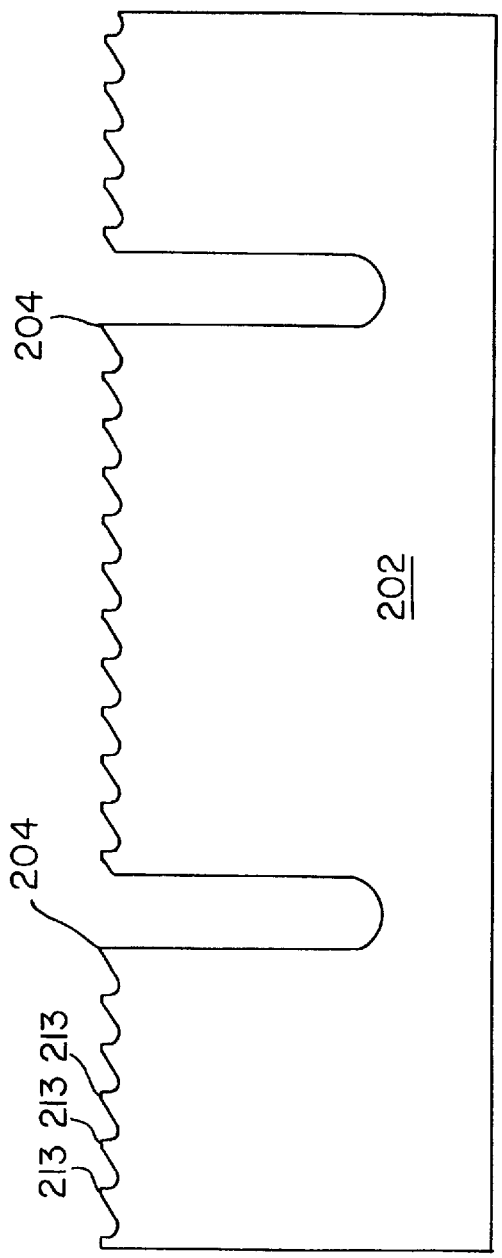
FIG. 4 shows an unfurled fast-cut hole saw hole cup used to form the embodiment of the invention shown in FIG. 3.
Figure 5:
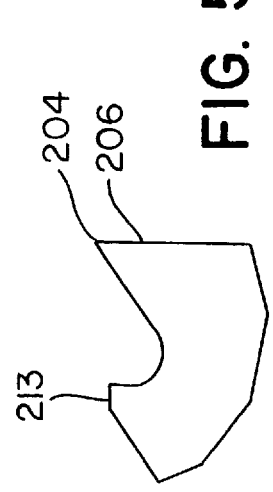
FIG. 5 is an enlarged detail of the cutting teeth and raker teeth of FIG. 4.

Turning now to FIGS. 4 and 5, it can be seen that the raker teeth 212 define a four or six teeth per inch (tpi) configuration, and have a truncated triangular configuration when compared to the cutting teeth 204. As illustrated in FIG. 5, the optimal drop or media engagement distance from the cutting teeth 204 to the raker teeth 212 is about 0.030" for the two tooth/two gullet fast-cut hole saw design. The possible range of this drop or spacing could be from about 0.010" to about 0.060". Depending upon the number of cutting teeth, an increased "drop" may be used, such as about 0.100" for a hole saw with eight cutting teeth and two secondary gullets. Although the raker teeth 212 are not cutting at their leading edge 213, it is believed that these raker teeth 212 are doing some amount of side cutting. By using the side cutting of the raker teeth 212, the cutting teeth 204 may both be directed to the inside diameter (ID) or outside diameter (OD).

In another variation, while two cutting teeth are preferred, four or six or eight cutting teeth may be used so long as chord "gaps" separate the teeth in a manner which enables the chip debris to be directed by the cutting teeth into the gullets and be removed through the gullets during the cutting process. By having a substantial chord length of between about 45 to about 180 degrees without cutting teeth, the advantages of the invention can be realized.

By way of example, and as illustrated in FIGS. 6–8, various embodiments of the present invention having two cutting teeth/two secondary gullets with a plurality of raker teeth can be used in to achieve various sizes of selected hole saws, e.g., such as in FIG. 6 having about a 1⅛ inch diameter, FIG. 7 having about a 1¼ inch diameter, and FIG. 8 having from about a 1½ inch diameter to about a 2½ inch diameter.

In more detail, tests of the variations of the invention having four cutting teeth and four gullets, and four cutting teeth and two gullets were found to offer the substantially the same level of performance improvement. While the number of secondary gullets may also be increased consistent with the expanded number of cutting teeth, two secondary gullets (or a number of gullets less than the number of cutting teeth) are preferred in order to ensure structural rigidity of the hole saw.

In yet a further variation, while even numbers of teeth with suitable chord length therebetween are preferred, an odd numbered set of cutting teeth can also be utilized. For example, an odd number of cutting teeth may be used, such as three, five, or seven cutting teeth. While this may cause a mild imbalance between cutting teeth of the hole saw addressing the OD and ID of the cutting hole, a suitable hole saw can be configured by using unequal chord lengths between the teeth, or by changing cutting tooth exposure (or a combination thereof) so as to provide an acceptable fast-cut hole saw.

In yet another variation, the defined cross-sectional area of the secondary gullets should be sized to be more than about 20 to about 60 times larger than the "primary" gullets found in a prior art Bimetal hole saws, and preferably about 50 times larger than the "primary" gullets in prior art Bimetal hole saws. While the secondary gullets illustrated in FIGS. 2–8 define slot-like openings, such gullets make have any shape of any configuration so long as the gullet opening is suitable in depth and shape to allow removal of the cutting debris. For example, the gullets may be angled in relation to the longitudinal axis of the holesaw, or the side edges of the gullets may define angular, concave or convex edges having various ranges and degrees of radial spacing between the opposed gullet edges.

In still yet another variation, the gullets 107,207 may define a minimum chord length or breadth ("c-c") at least greater than a chord length than the chord length of the cutting teeth 104,204. For example, a chord length starting from about 1/16–1/8 of an inch to about 1/4–1/2 of an inch may be used depending upon the number of cutting teeth, the diameter of the hole saw and desired rigidity of the hole saw.

In yet another variation, a center drill 108,208 (or "drill") is typically secured or affixed to the bottom center of the cup 102,202 by an arbor 110,120, mandrel, or the like. For example, U.S. Pat. No. 5,435,672 issued to Richard L. Hall et al. Jul. 25, 1995 entitled "Hole Saw Having Plug Ejection Feature", hereby incorporated by reference, illustrates among other features one arrangement of securing or positioning a center drill 108,208 in a base end of the cup 102,202. This center drill 108,208 provides precise centering of the hole saw 100,200 to cut a hole of predetermined size, with a plurality of proximate, closely spaced circumferential positioned cutting teeth 104,204 providing the cutting of the outside perimeter of the hole.

The embodiments described above provide a number of significant advantages. For example, this invention provides the important advantage of improving chip flow from the cutting edge and therefore increasing cutting efficiency and improving the ability of the hole saw to remove chips from the cutting site. This is accomplished by removing a significant number of the cutting teeth, with the preferred embodiment comprising two teeth being approximately 180 degrees opposed to one another. This increases the chip load per tooth and to concentrate chip flow. As yet another advantage, the combination of the reduced cutting teeth with "large" predetermined gullets added flush to the leading edge of the cutting tooth provides the chips an improved vehicle to flow out of the cutting area and thereby increase efficiency of the hole saw.

It is believed that this new design provides a significantly measurable improvement in the cutting effectiveness over standard carbon steel Bimetal or high speed steel (HSS) hole saws. As described above, this design is not found in conventional hole saws employing set Bimetal or HSS teeth, and is in contrast to the single tooth prior art Enduro brand carbide tipped hole saw having a single secondary gullet.

Of course, it should be understood that a wide range of changes and modifications can be made to the preferred embodiment described above. It is therefore intended that the foregoing detailed description be understood that it is the following claims, including all equivalents, which are intended to define the scope of this invention.

I claim:

1. A hole saw comprising a cup with at least two cutting teeth positioned on the open end of the cup, said at least two cutting teeth disposed to provide balanced engagement of said cutting teeth to a work surface, one of said teeth having a cutting edge directed outward of the circumference of the cup and the one of said cutting teeth having a cutting edge directed inwardly of said circumference of said cup, said at least two teeth spaced apart by a chord of between about 45 to about 180 degrees, a plurality of raker teeth positioned on said chords between said cutting teeth, said raker teeth disposed below said cutting teeth to engage and move cutting debris formed by said cutting teeth, said cup defining secondary gullets positioned proximate to the cutting edge of said at least two cutting teeth, said gullets having a predetermined depth and shape along a longitudinal axis of said cup to remove debris from the cup during a portion of the duration of the hole cut.

2. The invention of claim 1, wherein said gullets defined opened ended gullets immediately proximate to said forward edge of said cutting teeth.

3. The invention of claim 2, wherein a edge of the gullet is flush with the cutting edge of the cutting teeth.

4. The invention of claim 1, wherein said cup is formed of a Bimetal structure having cutting edges of said at least two cutting teeth formed of HSS.

5. The invention of claim 1, wherein said at least two cutting teeth are formed by carbide teeth affixed to said cup.

6. The invention of claim 1, wherein a center drill is affixed at the bottom center of the cup.

7. The invention of claim 1, wherein said raker teeth are disposed about 0.010 to about 0.100 inches below said cutting teeth.

8. The invention of claim 7, wherein said raker teeth are disposed about 0.020 to 0.060 inches below said cutting teeth.

9. The invention of claim 8, wherein said raker teeth are disposed about 0.030 inches below said cutting teeth.

10. The invention of claim 1, wherein said cutting teeth are formed to a predetermined shape and said raker teeth define a truncated form of said predetermined shape thereby positioning said raker teeth below said cutting teeth.

11. A hole saw comprising a cup with at least two cutting teeth positioned on the open end of the cup, said at least two teeth spaced apart by a chord of between about 45 to about 180 degrees, a plurality of raker teeth positioned between said cutting teeth on a circumference portion of said open cup end as defined by said chord, said raker teeth disposed below said cutting teeth to engage and move cutting debris formed by said cutting teeth, said cup defining secondary gullets positioned proximate to the cutting edge of said at least two cutting teeth, said gullets having a predetermined depth and shape along a longitudinal axis of said cup to remove debris from the cup during a portion of the duration of the hole cut.

12. The invention of claim 11, wherein each of said cutting teeth having a cutting edge directed outward of the circumference of the cup.

13. The invention of claim 11, wherein each of said cutting teeth having a cutting edge directed inwardly of said circumference of the cup.

14. The invention of claim 11, wherein said at least two cutting teeth disposed to provide balanced engagement of said cutting teeth to a work surface.

* * * * *